(12) United States Patent
Wilson et al.

(10) Patent No.: US 7,647,504 B2
(45) Date of Patent: *Jan. 12, 2010

(54) METHOD AND SYSTEM FOR EFFICIENTLY RETRIEVING SECURED DATA BY SECURELY PRE-PROCESSING PROVIDED ACCESS INFORMATION

(75) Inventors: James D. Wilson, Collierville, TN (US);
Robert F. Snapp, Memphis, TN (US);
David J. Payne, Collierville, TN (US);
Edgar H. Gillock, II, Memphis, TN (US)

(73) Assignee: United States Postal Service, Washington, DC (US)

( * ) Notice: Subject to any disclaimer, the term of this patent is extended or adjusted under 35 U.S.C. 154(b) by 124 days.

This patent is subject to a terminal disclaimer.

(21) Appl. No.: 11/638,445

(22) Filed: Dec. 14, 2006

(65) Prior Publication Data

US 2007/0094511 A1 Apr. 26, 2007

Related U.S. Application Data

(63) Continuation of application No. 11/235,243, filed on Sep. 27, 2005, now Pat. No. 7,549,053, which is a continuation of application No. 10/459,013, filed on Jun. 11, 2003, now Pat. No. 7,159,119, and a continuation-in-part of application No. 10/377,989, filed on Feb. 28, 2003.

(60) Provisional application No. 60/409,282, filed on Sep. 6, 2002.

(51) Int. Cl.
*H04L 9/32* (2006.01)

(52) U.S. Cl. .................. 713/181; 713/168; 713/150

(58) Field of Classification Search .................. None
See application file for complete search history.

(56) References Cited

U.S. PATENT DOCUMENTS 4,871,903 A 10/1989 Carrell (Continued)

FOREIGN PATENT DOCUMENTS

CN 1311486 9/2001

(Continued)

OTHER PUBLICATIONS

PCT Written Opinion dated Sep. 7, 2006, for Int'l Appl. No. PCT/US03/12711 (8 pages).

(Continued)

*Primary Examiner*—Pramila Parthasarathy
(74) *Attorney, Agent, or Firm*—Finnegan, Henderson, Farabow, Garrett & Dunner LLP

(57) ABSTRACT

A method and system for efficiently retrieving secured data by securely pre-processing provided access information, provides data store security based on a single piece of access information, which is generally public, such as the proper name of a business or individual that is used to retrieve mailing address information. The access information is hashed for access to a secured data store and efficient access and low data storage for permutations of input access information are provided by verifying the presence of an entry for the hashed access information in a look-up table. If an entry is found, the data store is accessed using the hashed access information, but if an entry is not found, another look-up table corresponding to another information type may be tried or the input access information permuted and retried.

18 Claims, 4 Drawing Sheets

U.S. PATENT DOCUMENTS

| | | | |
|---|---|---|---|
| 5,204,966 | A | 4/1993 | Wittenberg et al. |
| 5,420,403 | A | 5/1995 | Allum et al. |
| 5,491,752 | A * | 2/1996 | Kaufman et al. ............... 380/30 |
| 5,742,807 | A | 4/1998 | Masinter |
| 5,819,291 | A | 10/1998 | Haimowitz et al. |
| 5,903,651 | A | 5/1999 | Kocher |
| 5,933,604 | A | 8/1999 | Inakoshi |
| 5,966,542 | A | 10/1999 | Tock |
| 6,006,200 | A | 12/1999 | Boies et al. |
| 6,289,334 | B1 | 9/2001 | Reiner et al. |
| 6,289,450 | B1 | 9/2001 | Pensak et al. |
| 6,308,247 | B1 | 10/2001 | Ackerman et al. |
| 6,347,376 | B1 | 2/2002 | Attwood et al. |
| 6,457,012 | B1 | 9/2002 | Jatkowski |
| 6,516,320 | B1 | 2/2003 | Odom et al. |
| 6,754,785 | B2 | 6/2004 | Chow et al. |
| 6,763,344 | B1 | 7/2004 | Osentoski et al. |
| 7,124,408 | B1 | 10/2006 | Parthasarathy et al. |
| 7,159,119 | B2 | 1/2007 | Wilson et al. |
| 7,302,582 | B2 * | 11/2007 | Snapp et al. ................ 713/185 |
| 2001/0044783 | A1 | 11/2001 | Weisberg et al. |
| 2002/0049670 | A1 | 4/2002 | Moritsu et al. |
| 2003/0028783 | A1 | 2/2003 | Collins et al. |
| 2003/0177021 | A1 | 9/2003 | Dutta |
| 2004/0065598 | A1 | 4/2004 | Ross et al. |
| 2004/0111443 | A1 | 6/2004 | Wong et al. |
| 2004/0128247 | A1 | 7/2004 | Sato et al. |
| 2004/0128274 | A1 | 7/2004 | Snapp et al. |
| 2004/0181670 | A1 | 9/2004 | Thune et al. |
| 2004/0210763 | A1 | 10/2004 | Jonas |
| 2005/0060556 | A1 | 3/2005 | Jonas |
| 2005/0066182 | A1 | 3/2005 | Jonas et al. |

FOREIGN PATENT DOCUMENTS

| | | |
|---|---|---|
| DE | 44 21 640 | 8/1995 |
| EP | 0 381 418 | 8/1990 |
| JP | 08-235040 | 9/1996 |
| JP | 11-306676 | 11/1999 |
| JP | 2001-043135 | 2/2001 |
| JP | 2002-202938 | 7/2002 |
| WO | WO 2004/023711 A1 | 6/2003 |

OTHER PUBLICATIONS

Carter et al., "Exact and Approximate Membership Testers," ACM 10$^{th}$ STOC, pp. 59-65, (1978).
Bellare et al., "Collision-Resistant Hashing: Towards Making UOWHFs Practical"; Proceedings of the Annual Int'l Cryptology Conference (CRYPTO); Berlin, Springer, Germany; vol. Conf. 17, pp. 470-484, (1997).
International Search Report for PCT/US01/26125 mailed Mar. 26, 2002.
"IBM DB2 Anonymous Resolution Version 3.8 Technical Information," Publication of IBM Corporation, USA, May 2005 (2 pages).
Friedrich, Andrew, "IBM DB2 Anonymous Resolution: Knowledge Discovery Without Knowledge Disclosure," Whitepaper of IBM Corporation, USA, May 2005 (23 pages).
"DB2 Anonymous Resolution for Public Safety, Corrections, & Criminal Intelligence," Publication of IBM Corporation, USA, Feb. 2005 (2 pages).
"DB2 Anonymous Resolution," Publication of IBM Corporation, USA, May 2005 (2 pages).
Lohr, Steve, "I.B.M. Software Aims to Provide Security Without Sacrificing Privacy," The New York Times, May 24, 2005 (2 pages).
"Application of DB2 Anonymous Resolution to the Financial Services Industry," Whitepaper of IBM Corporation, USA, May 2005 (17 pages).
Office Action, dated Jun. 3, 2008, for U.S. Appl. No. 11/235,243, filed Sep. 27, 2005 (9 pages).
Pre-Interview Communication, dated Sep. 12, 2008 for U.S. Appl. No. 11/231,989, filed Sep. 22, 2005 (3 pages); and Second Preliminary Amendment, filed Aug. 20, 2008, including listing of pending claims (9 pages).
PCT International Search Report, dated Oct. 17, 2003 and Written Opinion, dated Aug. 2, 2004 for International Application No. PCT/US03/18412 (12 pages).
PCT Written Opinion, dated Feb. 13, 2003, International Preliminary Examination Report, completed May 6, 2003, and International Search Report, dated Mar. 26, 2002, for International Application No. PCT/US01/26125 (12 pages).
PCT International Search Report, dated May 23, 2003, for International Application No. PCT/US03/06672 (5 pages), PCT International Preliminary Examination Report, completed Oct. 31, 2003, mailed Nov. 12, 2003 (4 pages).
First Examination Report from the Government of India Patent Office, dated Dec. 1, 2006 for Patent Application No. 577/KOLNP/2005 (3 pages).
Notice of Allowance and Allowability, dated Jul. 1, 2008, for U.S. Appl. No. 10/377,989, filed Feb. 28, 2003 (5 pages); Office Action, mailed Apr. 15, 2005 (4 pages); and Response to Office Action filed Aug. 15, 2005, including listing of allowed claims (10 pages).
Office Action, dated Nov. 28, 2006, for U.S. Appl. No. 10/344,990, filed Feb. 20, 2003 (4 pages).
Office Action, dated Apr. 4, 2006, for U.S. Appl. No. 10/344,990, filed Feb. 20, 2003 (8 pages).
Office Action, dated Oct. 27, 2005, for U.S. Appl. No. 10/459,013, filed Jun. 11, 2003 (12 pages).
Office Action, dated Mar. 24, 2005, for U.S. Appl. No. 10/459,013, filed Jun. 11, 2003 (14 pages).
Office Action, dated Sep. 3, 2004, for U.S. Appl. No. 10/459,013, filed Jun. 11, 2003 (12 pages).
Office Action, dated Sep. 20, 2004, for U.S. Appl. No. 10/377,989, filed Feb. 28, 2003 (4 pages).
Office Action, dated Aug. 7, 2008, for U.S. Appl. No. 11/231,989, filed Sep. 22, 2005 (15 pages).
Pre-Interview First Office Action, dated Dec. 2, 2008, for U.S. Appl. No. 11/231,989, filed Sep. 22, 2005 (3 pages).
Interview Summary, dated Nov. 30, 2004, for U.S. Appl. No. 10/459,013, filed Jun. 11, 2003 (2 pages).
Interview Summary, dated Sep. 21, 2005, for U.S. Appl. No. 10/459,013, filed Jun. 11, 2003 (2 pages).
Notice of Allowance and Allowability, dated Jul. 17, 2007, for U.S. Appl. No. 10/344,990 (6 pages).
Notice of Allowance and Allowability, dated May 17, 2006, for U.S. Appl. No. 10/459,013 (16 pages).
Notice of Allowance and Allowability, dated Jan. 13, 2009, for U.S. Appl. No. 11/235,243 (6 pages) with Response to Office Action, filed Nov. 12, 2008, including listing of allowed claims (18 pages).
Second Supplemental Preliminary Amendment, filed Aug. 20, 2008, for U.S. Appl. No. 11/231,989, filed Sep. 22, 2005, including listing of claims (9 pages).
Chinese Office Action, dated Nov. 21, 2008, for Chinese Application No. 03824536.1 (11 pages).
Supplementary European Search Report, dated Feb. 17, 2009, for European Application No. 03739087.9-1525 (3 pages).
Office Action, dated Jun. 26, 2009, for U.S. Appl. No. 11/231,787, filed Sep. 22, 2005 (7 pages).
Notice of Allowance and Allowability, dated May 4, 2009, for U.S. Appl. No. 10/377,989 (4 pages), with Response to Office Action, filed Aug. 15, 2005, including listing of allowed claims (10 pages).
Notice of Allowance and Allowability, dated Jun. 30, 2009, for U.S. Appl. No. 11/231,989 (12 pages), with Supplemental Amendment, filed Mar. 10, 2009, including listing of allowed claims (10 pages).
Office Action, dated May 8, 2009, for Chinese Application No. 03824536.1, filed Jun. 11, 2003 (8 pages).
Office Action, dated May 26, 2009, for Japanese Application No. 2004-534223, filed Jun. 11, 2003 (9 pages).

* cited by examiner

METHOD AND SYSTEM FOR EFFICIENTLY RETRIEVING SECURED DATA BY SECURELY PRE-PROCESSING PROVIDED ACCESS INFORMATION

RELATED APPLICATIONS

This is a continuation of, and claims the benefit of U.S. application Ser. No. 11/235,243, filed Sep. 27, 2005, now U.S. Pat. No. 7,549,053 which is a continuation of and claims benefit of U.S. application Ser. No. 10/459,013, filed Jun. 11, 2003, now U.S. Pat. No. 7,159,119 which claims priority to U.S. Provisional Application No. 60/409,282, filed Sep. 6, 2002, and is a continuation-in-part of U.S. application Ser. No. 10/377,989, filed Feb. 28, 2003, entitled "METHOD AND SYSTEM FOR STORING AND RETRIEVING DATA USING HASH-ACCESSED MULTIPLE DATA STORES". This application is further related to U.S. Pat. No. 6,886,747 for "SYSTEM AND METHOD FOR STANDARDIZING A MAILING ADDRESS", issued May 3, 2005, and pending U.S. patent applications for "A METHOD FOR CORRECTING A MAILING ADDRESS", Ser. No. 10/384,915, filed Mar. 6, 2003; and "DELIVERY POINT VALIDATION SYSTEM", Ser. No. 10/344,990, filed Feb. 20, 2003. All the mentioned patents and patent applications are hereby incorporated herein by reference.

BACKGROUND

1. Field of the Invention

The present invention relates generally to secure database data retrieval, and more specifically, to a method and system for efficiently retrieving data from a secured database by pre-processing provided access information. The present invention relates specifically to a method and system for retrieving new mailing address information from a privatized mailing address database in response to permutations of name and old address inputs that are non-standardized.

2. Background of the Invention

Mailing address information privacy is protected by statutes such as 39 U.S.C. §412, that prevents the United States Postal Service (USPS) and others from providing a list of addresses and 5 U.S.C. §552(a) that prevents the revelation of private information for other than intended purposes. Consequently, the USPS must oversee authorized agents who are selected to possess sensitive data such as mailing address database information. Specifically, lists of mailing addresses must not be provided by the USPS or any agent, and when retrieving change-of-address information for a single party, name and address information for any other party must not be revealed.

The above-incorporated parent application "METHOD AND SYSTEM FOR STORING AND RETRIEVING DATA USING HASH-ACCESSED MULTIPLE DATA STORES" provides a secured data store that may contain address information and be distributed to vendors that are not agents supervised by the USPS. However, in order to use the method and system described in the above-referenced patent application, access information must be standardized and filtered (pre-processed) so that the information placed in the data store may be retrieved. While the above-referenced patent application describes a level of pre-processing that obtains an 11-digit delivery point code (DPC) that is used to access the data stores and retrieve associated address information, the DPC must be obtainable from user input or other data entry, such as records in other data stores, before the address information can be accessed.

However, stored data, user input and access information provide by other sources that correspond to the name of a business or an individual may not be uniform and may contain errors. For example, a user verifying the address for ABC, Inc. known as ABC Computers, where valid identifiers may be Albuquerque Computers, Inc., ABC Computers, ABQ Computers, ABC, Inc. and a number of other permutations that should provide access to the requested new mailing address information, when a valid old address is supplied in conjunction. Further, when verifying the address of an individual, valid variations in proper names may also yield many permutations that should provide access to the requested mailing address information.

In order to process permutations of access information, however, a typical software application would need to contain the required access information in order to match the permutations and to determine to which type of entity (business or individual) a particular input corresponds. Such embedding of the information in the above-described data store system would compromise the security provided by the system.

Therefore, it would be desirable to provide a method and system for retrieving information from a secured data store that securely pre-processes provided access information and provides efficient retrieval of address information in response to permutations of access information input.

SUMMARY OF THE INVENTION

The above objective of efficiently retrieving information from a secured data store by securely pre-processing access information is accomplished in a method and system for retrieving data. The method may also be embodied in a computer program product and system containing computer-readable program instructions for carrying out the steps of the method on a general-purpose or workstation computer system.

The method for retrieving data receives input of access information such as an entity name and old mailing address. The access information is pre-processed by extracting a non-type-dependent portion of the access information and hashing the non-type-dependent portion to provide an access key to one or more look-up tables. Presence in the look-up tables verifies whether or not an entry exists that corresponds to the access information and permits categorization of the access information by type (e.g., business or individual). Once an entry is found, type-dependent portions of the access information are pre-processed to standardize the non-type dependent portions (e.g., standardizing a business name or individual's name) and the pre-processing may be performed according to the access information type. Again, look-up tables may be consulted to determine whether or not data is present in the data store corresponding to the access information. If data is present, requested secured data is retrieved from the secured data store using the security retrieval algorithm associated with the data store. If an entry is not found, the type-dependent portion of the access information can be permuted and access attempts can be reiteratively made until possible permutations are exhausted.

DETAILED DESCRIPTION OF THE EMBODIMENTS

Figure 1:
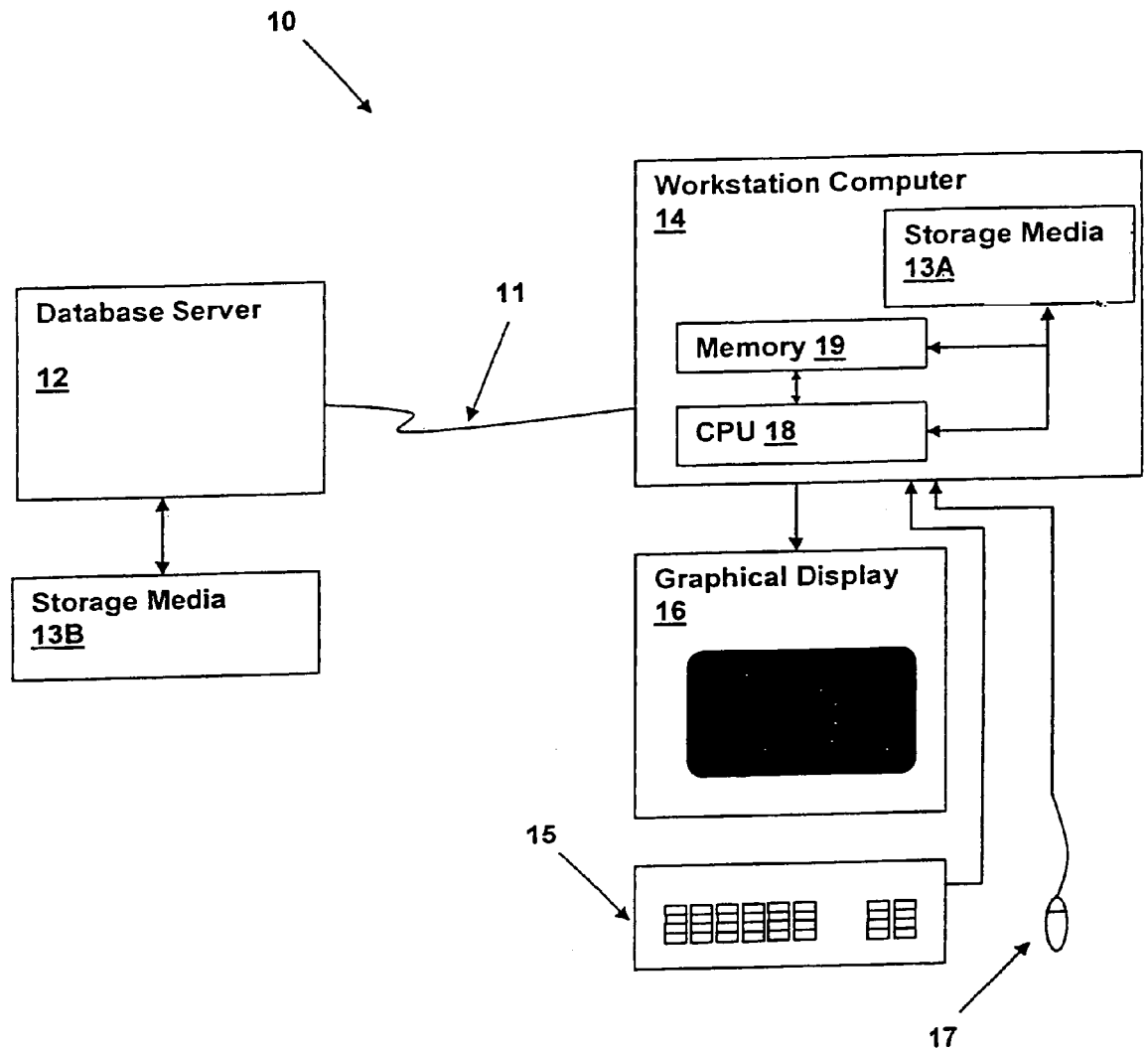
FIG. 1 is a block diagram depicting a computer system in which the present invention may be practiced.

Referring now to the figures and in particular to FIG. 1, there is depicted a computer system 10 within which a method may be performed via the execution of program instructions forming a computer program product and computer system in accordance with an embodiment of the present invention. The method may employ program instructions located within a memory 19 of a workstation computer 14 and executed by a central processing unit 18 (CPU) and the data store and look-up tables of the present invention may be located entirely within a storage media 13A and memory 19. Alternatively, workstation computer 14 may be coupled via a network 11 connection for coupling workstation computer 14 to a network such as a local-area network (LAN), wide-area network (WAN) or the Internet. In a network implementation, the data store and/or program instructions for implementing the methods of the present invention may be located within a database server 12 coupled to a storage media 13B.

The method of the present invention provides inherent database security, permitting distribution of a program, data store and look-up tables to an end-user for execution on workstation computer 14 or access to the data store/look-up tables and execution of the program via the Internet or other network. Other combinations such as local-hosted program with remote data store, local data store with remote-hosted program are possible and should be understood to be variations in accordance with embodiments of the present invention.

A specific embodiment or set of embodiments is described herein for application to securing change-of-address information for business names and addresses and individual names and addresses. The use of the term "individual" should be understood to refer to family names as well, as a change-of-address can be entered for a family or an individual. The system and method provide a new address, given an old address and entity (individual/family or business) name as input. In the case of either business or individual/family names, the data store may also contain footnote indicators that verify that a move has taken place, but no change-of-address data is available. Such output may also be provided if conflicting information is found in the data store. The system may indicate that a known move has occurred, but that a new address is unavailable as a valid output.

Figure 2:
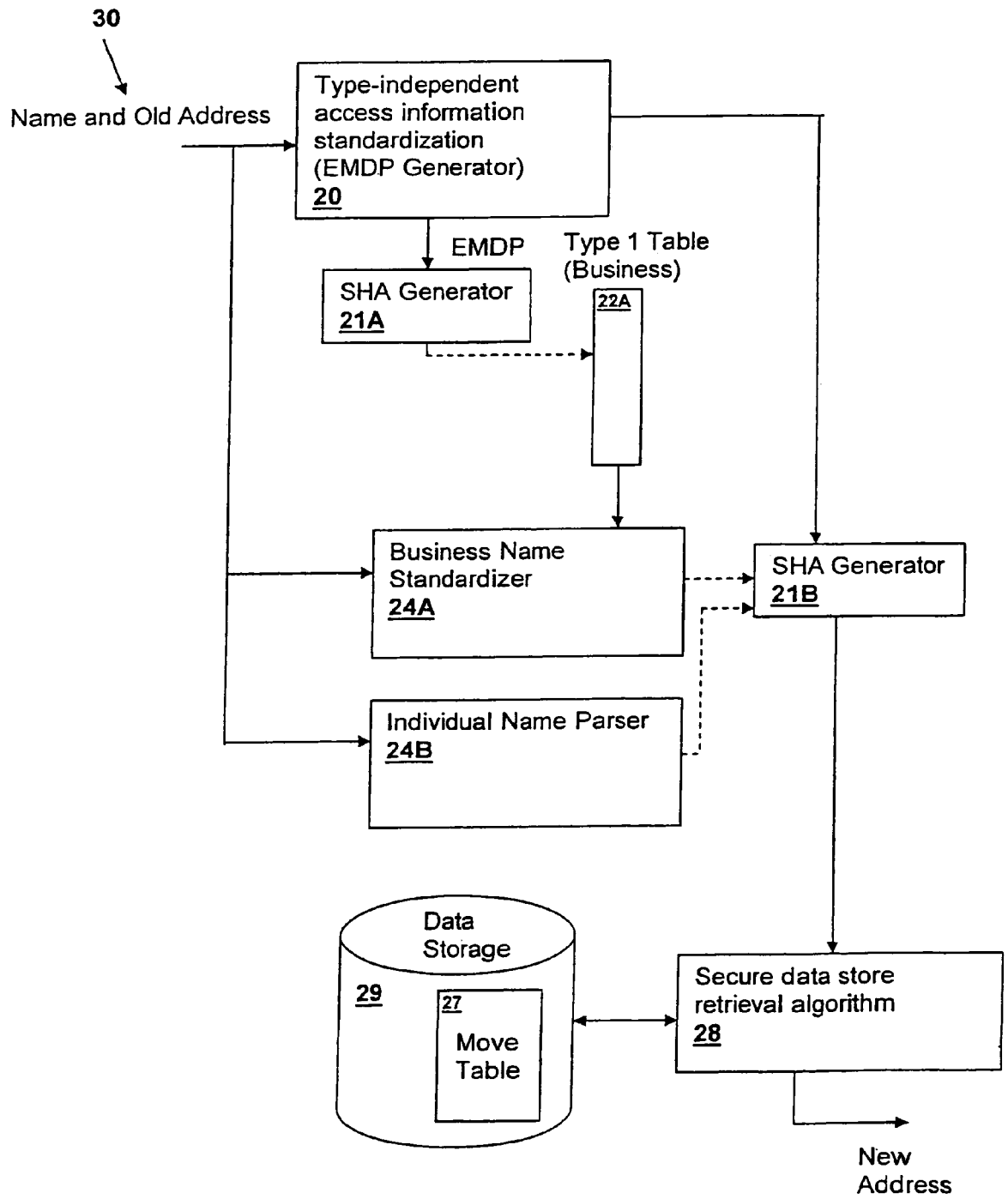
FIG. 2 is a pictorial diagram depicting the flow of access information in accordance with an embodiment of the present invention.

Referring now to FIG. 2, a flow of information between computer program modules accordance with an embodiment of the present invention is shown. Access information 30, (for example, an old mailing address and entity name) is provided to a type-independent access information standardization module 20, which may be an enhanced modified delivery point (EDMP) generator in accordance with the techniques described in the above-incorporated U.S. Patent Application "SYSTEM AND METHOD FOR STANDARDIZING A MAILING ADDRESS", which produces a single numeric representation of a mailing address (an EDMP) given one of many permutations or expressions of a mailing address. The details of the techniques can be determined from the above-referenced patent application, but, in general, a postal code such as a ZIP Code or ZIP+4 Code extracted from the mailing address is concatenated with numeric fields (e.g., street number and unit number) extracted from the mailing address to provide a standardized address that is not dependent on spelling, street type (e.g., road, place, boulevard, street, etc.) or other variant (e.g., suite, apartment, apt., etc.).

Once a standardized version of the type-independent portion of the access information has been produced by standardization module 20, the standardized information (e.g., an EDMP) is hashed using a Secure Hash Algorithm (SHA) by SHA generator 21A. The algorithm used by SHA generator 21A may be a SHA-1 algorithm, or may be another hashing algorithm that provides sufficient security.

Details of SHA-1 algorithms are described in the "SECURE HASH STANDARD", Federal Information Processing Standards Publication 180-1 issued by the National Institute of Standards and Technology (NIST), an agency of the U.S. government. The SHA-1 algorithm is typically used for producing a condensed version of a message for verification through a Digital Signature Algorithm (DSA). The condensed version of the message (the message digest) encoded in a digital signature can be compared to a message digest generated from a received for verification that the received message content is the same as the transmitted message content. The message digest is a 20-byte number that is typically used for signature/message verification, but will be used herein in a new manner to provide access to the look-up tables and data stores of the present invention.

The present invention uses the SHA-1 algorithm to produce a representation of the access information or portions thereof for access to look-up tables and access to data stores and not for the above-described original purpose of the SHA-1 algorithm. It should be understood that other algorithms may be used to produce the hashed representation of the access information as used in the present invention and that use of the SHA-1 algorithm is a convenience and not a limitation of the present invention.

Once the hashed version of the type-independent portion of the access information is obtained, one or more look-up tables 22A are consulted to determine whether or not an entry exists for the access information according to the entry type associated with the look-up tables 22A. In the illustrated embodiment, look-up tables 22A comprises a single table that indicates whether or not there is an entry for a business at the EDMP produced by standardization generator 20. Since the change-of-address system described as an embodiment of the invention herein manages two information types (i.e., business entries and individual entries), only one look-up table 22A is required, as absence of an entry in look-up table 22A is used as a presumption that the EDMP is associated with an individual. However, other embodiments of the invention may manage more than two information types, and therefore multiple look-up tables may be used to consecutively filter the information in order to determine a valid entry type.

Look-up table 22A may be implemented as a bit array as described in the above-incorporated U.S. Patent Application entitled "DELIVERY POINT VALIDATION SYSTEM", which describes the use of a bit array for verification of the presence of an address entry in the look-up table that has very low computational overhead on retrieval of the information. Address indicia that changes, e.g., street renaming, unit renumbering, etc. are updated in the look-up table as described in the above-incorporated patent application "METHOD FOR CORRECTING A MAILING ADDRESS". The delivery point validation technique provides the hashed EMDP to an extraction algorithm that selects samples from the hashed EMDP (or other access information in applications other than a change-of-address system) that are used as offsets into the bit array. If a bit is set within the bit array, the presence of the individual sample is verified. If all samples are indicated as present, then the existence of an entry in look-up tables is verified. The above-referenced patent application provides further details of bit array implementation for verifying the validity of an EMDP or other data type.

If the EMDP is verified as a valid business address, a business name standardizer 24A standardizes the name provided as input (the type-dependent portion of access information). The business name standarizer 24A uses the ZIP Code to access a business name table that contains a list of correct business names as entered on the actual change-of-address card, Internet change-of-address system or other mechanism used to enter changes of address.

Once the business name has been standardized, the business name is provided to SHA generator 21B and combined with the EMDP and a SHA-1 result is generated. SHA generator 21B may use the same set of program instructions that provide SHA generator 21A or may be another algorithm that provides security to access a move table 27. Secure data store retrieval algorithm 28 provides access to move table 27, which is stored in data storage device 29 as a file. Exemplary move table 27 comprises multiple data stores as described in the above-incorporated parent application "METHOD AND SYSTEM FOR STORING AND RETRIEVING DATA USING HASH-ACCESSED MULTIPLE DATA STORES", which yields a new mailing address (or other information for other applications of the system) in response to access information that has been processed into a hashed result. The data store comprising all of the multiple data stores described in the above-referenced patent is very secure against data mining and prevents revelation of private data, unless all of the required access information (e.g., name and old mailing address) are known The above-referenced patent application describes the storing and retrieving of standardized address information and may be extended to other types of information, depending on the type of information retrieval required for the particular embodiment of the present invention. In particular, a mathematical representation of a new (moved-to) address is used with a change-of-address system in accordance with an embodiment of the present invention. The data that is placed in the data stores is 7-byte information that comprises a number computed from: a five digit ZIP Code Z[64000], a four-digit add-on with a two-digit delivery point selector ZP[1000000], a gender flag G[3], the first M1[27] and second M2[27] characters of the middle initial, the move effective date D[120], an address drop flag A[2] and a flag to indicate the use of a middle name MU[2]. The numbers in brackets following each of the above elements depicts the number of values or states that each of the above-listed elements can assume.

The mathematical expression of the stored address information is computed as a representation that essentially assigns a "digit" of a base equal to the number of states (or a greater arbitrary number) assumable by each of the above elements, and therefore is a sum of each of the elements multiplied by the next lower digit's base and the base of the digit itself. The expression for the stored data (which, once retrieved, is used to compute the elements of the address by modulo arithmetic to extract each "digit" knowing the base). The formula for the data stored in each element of data stores in the secured database is:

$$Data = ZP + 1,000,000*(Z + (64,000*(G + M2*3 + M1*81 + D*2187 + A*262440 + MU*524880)))$$

which can be equivalently expressed as described above, but for clarity of the relationship of the ZIP and ZIP+4 values to the stored/retrieved data, is expressed with the additional information grouped separately. The factors can be multiplied through to determine the base values of the individual digits. Upon extraction of a data element from the data store, the element is divided by the base values to yield modulo results giving the components of the new address. The above number will not exceed $254^7$, which is the maximum data size for the seven data store implementation of the storage and retrieval method disclosed in the above-referenced patent application. The data portions are retrieved, de-striped and combined after modulo-254 processing, then the new address is generated by performing the above variable-modulo computation to yield the individual new address elements.

As an alternative to the use of the multiple data store security techniques described in the above-referenced patent application, the look-up table techniques for improving the operating efficiency of the method of the present invention may be applied to other data security methods and algorithms in addition to the secure data store method of the above-referenced patent application. For example, an encrypted data store (as opposed to a hash-coded data store access) requires a large amount of computational overhead for retrieving data due to the decryption process. Look-up tables may be employed in front of such data stores to avoid searching an encrypted data store for invalid entries.

If the name provided in the description above does not correspond to a business name, then an Individual Name Parser 24B parses out the individual components of the name (e.g., first, middle and last) and also attempts to find a gender commonly associated with the name. The parsed name is supplied to SHA generator 21B, and is combined with the EMDP as in the case for the business name and move table 27 is checked for the presence of a change-of-address entry. If no entry is found, permutations of the name can be generated by Individual Name Parser 24B using common misspellings of the last name. Subsequent attempts can permute the name using known nicknames (from a nickname table) and common misspelling of the first name. Other tables may be used to provide sound-alike (via phonetic soundex representation) permutations with fuzzy logic exceptions to the sound-alike variations. For example, Baker and Becker may have the same soundex but are not considered equivalent. After the above-described variants have been attempted, a query is made using just the last name and address. An entry in move table 27 for a last name/address combination indicates a "family" move, where no one is left in a household having the same last name after a move.

Figure 3:
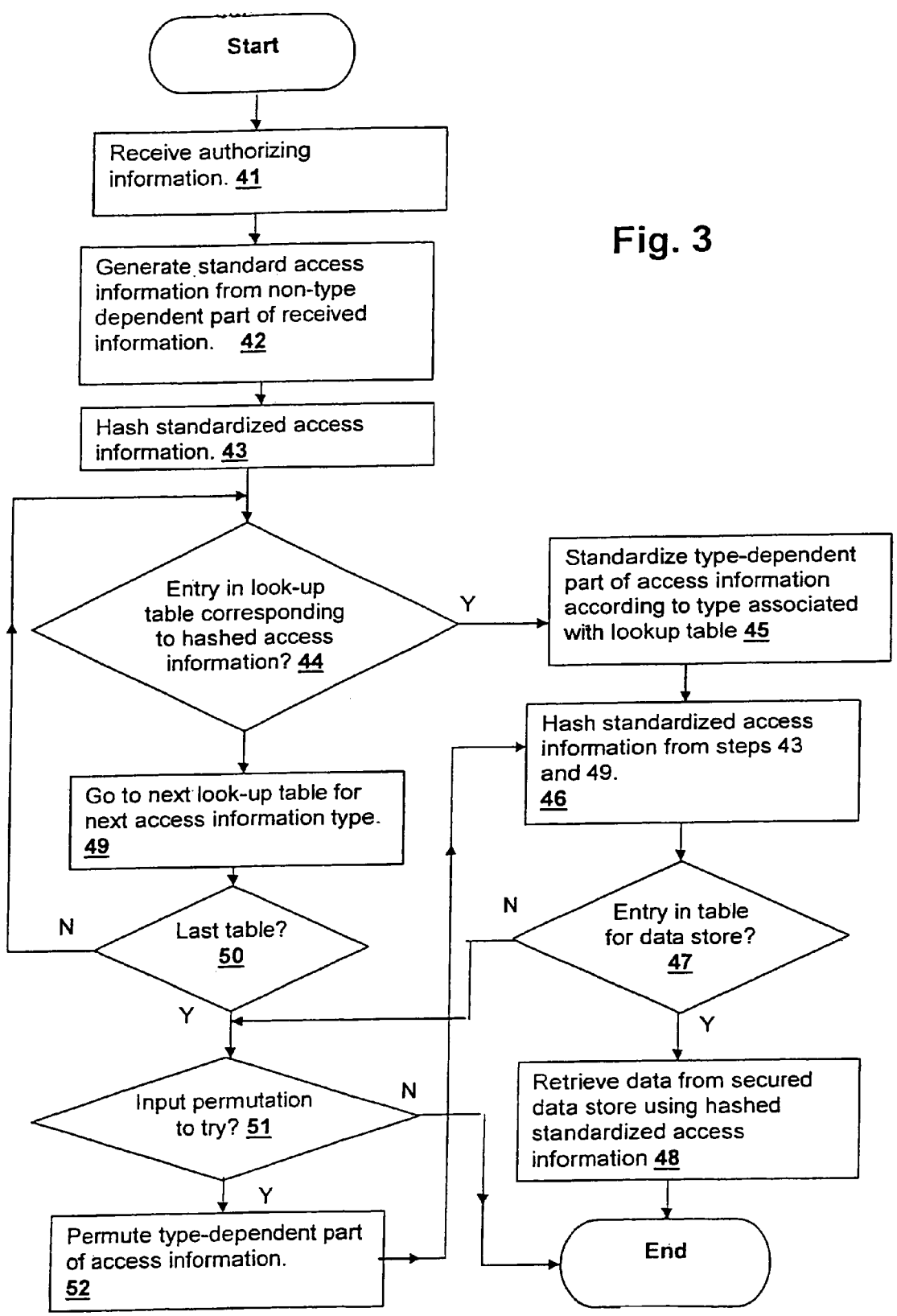
FIG. 3 is a flowchart depicting operation of the system executing a retrieval method in accordance with a generalized embodiment of the present invention.

Referring now to FIG. 3, a secure data retrieval method in accordance with a generic embodiment of the present invention is depicted. First, authorizing information is received (step 41) and standard access information is generated from a non-type dependent portion of the received access information (step 42). The standardized access information is hashed (step 43) and one or more look-up tables are consulted to determine if an entry exists for the hashed access information (decision 44). If an entry is found, the type-dependent portion of the access information is standardized according to the type corresponding to the look-up table in which the entry was found (step 45). The combined standardized access information from steps 43 and 49 is then hashed (step 46) and the presence of an entry is verified in the secure data store (decision 47). If there is an entry in the secure data store corresponding to the combined standardized access information (decision 47), the requested data is retrieved from the secure data store using the hashed combined standardized access information (step 48). If no entry was found in decision 47, if input permutations are to be tried and all permutations are not exhausted (decision 51), then the type-dependent portion of the access information is permuted (step 52) and another combined access information hashed result is computed according to step 46 and the steps of verifying (step 47) and retrieving (step 48) are repeated for the permutation(s).

If in decision 44, an entry is not found in the first look-up table, additional look-up tables may be consulted for other access information types (step 49) until the last table is reached (decision 50). The input from step 41 can be permuted according to step 51 if no entry is found in any table in step 44.

The method of FIG. 3 may be applied to any system that requires output of "revealed data" in response to the receipt of "authorizing data". For example, the following table depicts authorizing/revealed data pairs to which the method may be applied according to Table I below.

TABLE I

| Authorizing Data | Revealed Data |
| --- | --- |
| Vehicle Identification Number | Key Number |
| Full Name and Address | Unpublished Telephone Number |
| Full Name and Address | Credit Card Number |
| Computer Serial Number | Password |
| Full Name and Address | Weapon Registration Number |
| Patient ID Number | Medical Information |
| Last Name and Telephone Number | Limited Guest Invitation number |
| Biometric data (eye scan, palm print, DNA, thumbprint, etc.) | Name |
| Name and registration number | Email Address |

Table I is illustrative of private data that must be secured, and is not limiting, but exemplary of various applications for both government entities, businesses and private organizations.

Figure 4:
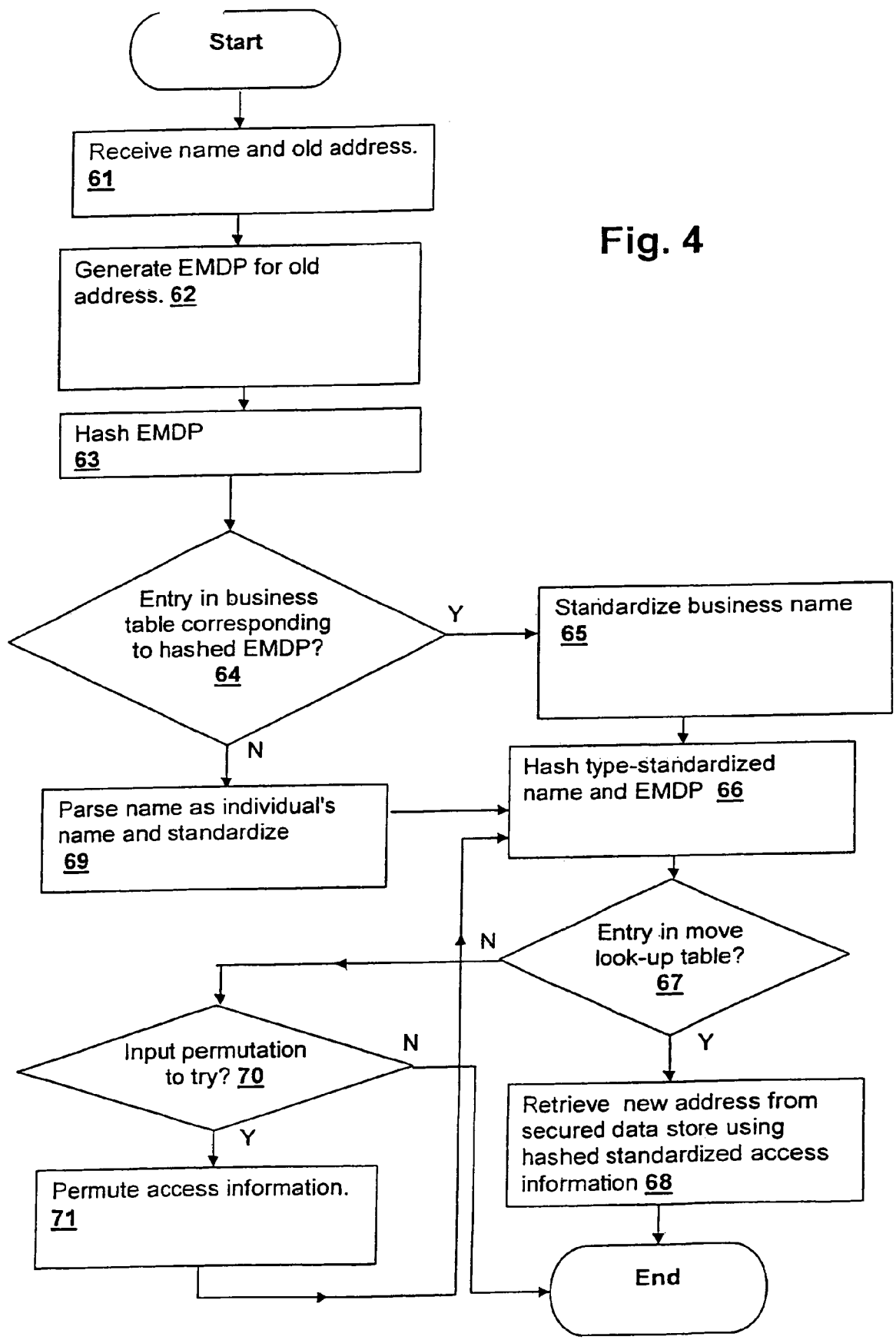
FIG. 4 is a flowchart depicting operation of the system executing a retrieval method in accordance with another specific embodiment of the present invention for retrieving change-of-address information.

Referring now to FIG. 4, a method in accordance with a specific embodiment of the invention as applied to a change-of-mailing address system is depicted. The name and old address of a business or individual is received (step 61) and an EMDP is generated for the old address (step 62). The EMDP is hashed (step 63) and the business change-of-address look-up table is consulted. If an entry is found in the business change-of-address look-up table (step 64), then the business name is standardized (step 65) using the business name table and hashed along with the EMDP (step 66). The move table is consulted to determine if an entry exists (decision 67) and if the entry exists, the new address is retrieved from the secured data store using the hashed standardized access information (step 68). If an entry is not found in the move table, further permutation of the input if available (decision 70), may be attempted (step 71) and the name and EMDP hashed (step 66) and the move table re-checked (decision 67) for an entry.

If a business entry was not found in decision 64, then the name and old address received in step 61 are presumed to be that of an individual and the name is parsed and standardized 69. The standardized name and EMDP are hashed (step 66) and the move table consulted (decision 67) to determine if an entry is present. If an entry is present, the individual's new address is extracted from the secured data store using the combined hashed result of step 68.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A method, implemented by a computing system, for retrieving secured data from a secured data store, comprising:

receiving access information from an inquiry source, said received access information being part of a data store inquiry;

extracting a type-independent portion of said received access information from said received access information;

hashing said type-independent portion of said received access information to produce a hashed result;

determining whether or not an entry corresponding to said hashed result is present in a look-up table;

in response to determining that said entry corresponding to said hashed result is present in said look-up table, retrieving said secured data corresponding to said received access information from said secured data store using said type-independent portion of said received access information and a secure retrieval algorithm associated with said secured data store; and transmitting information from said retrieved secured data to said inquiry source.

2. The method of claim 1, wherein said retrieving comprises:

standardizing a type dependent portion of said received access information;

combining said standardized type dependent portion of said received access information with said type-independent portion of said received access information;

hashing a result of said combining to obtain a combined hashed result; and accessing said secure data store with said combined hashed result.

3. The method of claim 2, wherein said accessing comprises:

splitting said combined hashed result into a plurality of offset fields, a quantity of said plurality of fields corresponding to a number of separate data stores in which portions of said secured data are stored;

accessing locations in said separate data stores using said offset fields as indices into said data stores, whereby portions of said secured data are retrieved from said locations; and combining said portions of said secure data to produce said secured data.

4. The method of claim 1, wherein said hashing is performed according to a SHA-1 algorithm.

5. The method of claim 1, wherein said look-up table is associated with a first type of said access information, and wherein said method further comprises in response to determining that said hashed result is not present in said look-up table, determining whether or not said hashed result is present in a second look-up table corresponding to a second type of said access information.

6. The method of claim 1, further comprising in response to determining that said hashed result is not present in said look-up table, permuting said access information to obtain permuted access information, and wherein said steps of hashing, determining and retrieving are performed in conformity with said permuted access information.

7. A computer system comprising a processor for executing program instructions and a memory coupled to said processor for storing program instructions and data, wherein said program instructions comprise program instructions for:

receiving access information, said received access information being part of a data store inquiry;

extracting a type-independent portion of said received access information from said received access information;

hashing said type-independent portion of said received access information to produce a hashed result;

determining whether or not an entry corresponding to said hashed result is present in a look-up table; and in response to determining that said entry corresponding to said hashed result is present in said look-up table, retrieving secured data corresponding to said received access information from a secured data store using said type-independent portion of said received access information and a secure retrieval algorithm associated with said secured data; and transmitting information from said retrieved secured data in response to said data store inquiry.

8. The computer system of claim 7, wherein said program instructions for retrieving comprise program instructions for:

standardizing a type dependent portion of said received access information, combining said standardized type dependent portion of said received access information with said type-independent portion of said received access information, hashing a result of said combining to obtain a combined hashed result, and accessing said secure data store with said combined hashed result.

9. The computer system of claim 8, wherein said program instructions for accessing comprise program instructions for:

splitting said combined hashed result into a plurality of offset fields, a quantity of said plurality of fields corresponding to a number of separate data stores in which portions of said secured data are stored, accessing locations in said separate data stores using said offset fields as indices into said data stores, whereby portions of said secured data are retrieved from said locations, and combining said portions of said secure data to produce said secured data.

10. The computer system of claim 7, wherein said program instructions for hashing implement a SHA-1 algorithm.

11. The computer system of claim 7, wherein said look-up table is associated with a first type of said access information, and wherein said program instructions further comprise program instructions for in response to determining that said hashed result is not present in said look-up table, determining whether or not said hashed result is present in a second look-up table corresponding to a second type of said access information.

12. The computer system of claim 9, further comprising program instructions for in response to determining that said hashed result is not present in said look-up table, permuting said access information to obtain permuted access information, and wherein said program instructions for hashing, determining and retrieving are executed again using said permuted access information as input.

13. A computer program product comprising a tangible media encoding program instructions for execution within a general-purpose computer system, wherein said program instructions comprise program instructions for:

receiving access information, said received access information being part of a data store inquiry;

extracting a type-independent portion of said received access information from said received access information;

hashing said type-independent portion of said received access information to produce a hashed result;

determining whether or not an entry corresponding to said hashed result is present in a look-up table;

in response to determining that said entry corresponding to said hashed result is present in said look-up table, retrieving secured data corresponding to said received access information from a secured data store using said type-independent portion of said received access information and a secure retrieval algorithm associated with said secured data store; and transmitting information from said retrieved secured data in response to said data store inquiry.

14. The computer program product of claim 13, wherein said program instructions for retrieving comprise program instructions for:

standardizing a type dependent portion of said received access information, combining said standardized type dependent portion of said received access information with said type-independent portion of said received access information, hashing a result of said combining to obtain a combined hashed result, and accessing said secure data store with said combined hashed result.

15. The computer program product of claim 14, wherein said program instructions for accessing comprise program instructions for:

splitting said combined hashed result into a plurality of offset fields, a quantity of said plurality of fields corresponding to a number of separate data stores in which portions of said secured data are stored, accessing locations in said separate data stores using said offset fields as indices into said data stores, whereby portions of said secured data are retrieved from said locations, and combining said portions of said secure data to produce said secured data.

16. The computer program product of claim 13, wherein said program instructions for hashing implement a SHA-1 algorithm.

17. The computer program product of claim 13, wherein said look-up table is associated with a first type of said access information, and wherein said program instructions further comprise program instructions for in response to determining that said hashed result is not present in said look-up table, determining whether or not said hashed result is present in a second look-up table corresponding to a second type of said access information.

18. The computer program product of claim 13, further comprising program instructions for in response to determining that said hashed result is not present in said look-up table, permuting said access information to obtain permuted access information, and wherein said program instructions for hashing, determining and retrieving are executed again using said permuted access information as input.

* * * * *